United States Patent [19]

Harris

[11] 3,832,500

[45] Aug. 27, 1974

[54] AUTOMATIC TELEPHONE SYSTEM WITH IMPROVED LINE SELECTING APPARATUS

[75] Inventor: Ben A. Harris, Irondequoit, N.Y.

[73] Assignee: Dynalec Corporation, New York, N.Y.

[22] Filed: Nov. 22, 1972

[21] Appl. No.: 308,741

[52] U.S. Cl. .......................... 179/186E, 179/18 FG

[51] Int. Cl. .......................... H04q 3/32

[58] Field of Search ......... 179/18 FG, 18 FF, 186 E

[56] References Cited

UNITED STATES PATENTS 3,621,144 11/1971 Jovic et al. .......................... 179/18

*Primary Examiner*—Kathleen H. Claffy
*Assistant Examiner*—C. T. Bartz

[57] ABSTRACT

An automatic telephone system utilizing matrix switching apparatus such as a crossbar switch and includes (1) a plurality of links wherein each link is responsive to a single appearance with respect to the cross-bar switch and (2) line selecting apparatus. The line selecting apparatus is coupled to the matrix switching apparatus and includes an oscillator which is effective to provide a stream of pulses, scanner logic responsive to such pulses to provide a plurality of level dependent function signals, particular ones of which correspond to decimal units and decimal tens respectively, with a particular combination of units and tens signals corresponding to a particular line; a plurality of monitoring circuits coupled to the scanner logic, each having a particular units terminal and a particular tens terminal and sequentially effective when each of these particular terminals simultaneously receives the function level signals to effect the actuation of a particular hold magnet in the crossbar switching apparatus. The scanner logic thereby causes the sequential actuation of line monitoring circuits and establishes crosspoints in the matrix switching apparatus for ringing and completing calls between an originating telephone subset and a terminating subset. The line selecting apparatus further includes a single current detector circuit coupled to the plurality of monitoring circuits and effective when one of such circuits is actuated for turning off the oscillator.

6 Claims, 4 Drawing Figures

AUTOMATIC TELEPHONE SYSTEM WITH IMPROVED LINE SELECTING APPARATUS

BACKGROUND OF THE INVENTION

1. Field of Invention

The present invention relates to automatic telephone systems.

2. Prior Art

Automatic dial telephone systems which employ crossbar switching apparatus are well known in the art. Typically, the crossbar switching apparatus is actuable, at least in part, by hold and select magnets. Line selecting apparatus provides signals directly to the hold magnets and further actuates an allotter apparatus which in turn actuates particular select magnets and link control circuitry to define a particular crossover point in the crossbar switching apparatus. Although such line selecting apparatus perform satisfactorily, they typically are rather complicated and require many components. Further, such telephone systems include a plurality of links each of which must receive a plurality of crossbar appearances to be actuated.

Accordingly, then, it is an object of the invention to provide a telephone system having an improved line selecting apparatus.

A further object is to provide a telephone system having links which are responsive to a single crossbar appearance.

It is a further object of the invention to provide a line selecting apparatus which is particularly suitable for use in servicing a relatively limited number of telephone subsets, say in the order of 200, and which is particularly suitable for use in shipboard type communication systems.

SUMMARY OF THE INVENTION

In accordance with a preferred embodiment of the invention, there is provided an automatic telephone system having an improved line-selecting apparatus and a crossbar switching apparatus coupled to links. The line selecting apparatus includes a free-running oscillator means effective to provide a stream of pulses, counting and decoding means responsive to such pulses to sequentially provide predetermined level dependent signals, particular ones of which correspond to decimal units and decimal tens respectively, with a particular units signal and a particular tens signal occurring at any given time corresponding to a particular line. The line selecting apparatus further include a plurality of line monitoring circuits each having a units input terminal and a tens input terminal and effective when such terminals simultaneously receive signals from the scanner to actuate a particular hold magnet. The line selecting apparatus still further includes a single current detector circuit coupled to the plurality of line monitoring circuits and effective when one of such line monitoring means and effective when one of such line monitoring circuits is actuated for turning off the oscillator means in response to but a single crossbar appearance when a particular link is selected.

It is a feature of the invention that the provision of a single current detector circuit for a plurality of monitoring circuits greatly simplifies the circuitry.

Other objects and advantages of the invention will become apparent from the detailed description of the preferred embodiment presented below.

DESCRIPTION OF THE DRAWINGS

In a detailed description of the preferred embodiment of the invention presented below, reference is made to the accompanying drawings in which.

DETAILED DESCRIPTION

Figure 1:
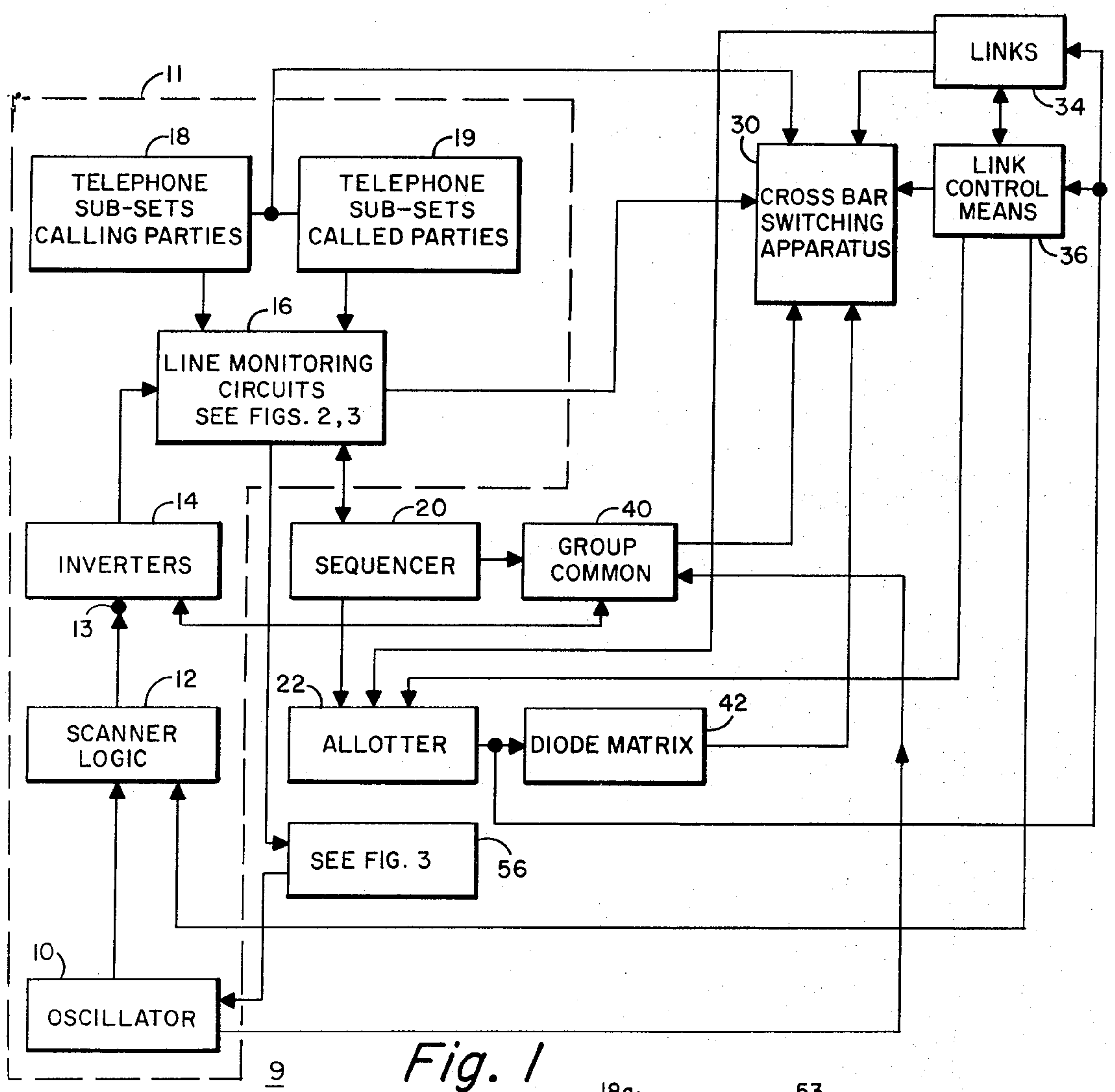
FIG. 1 is a block diagram of an automatic telephone system in accordance with the invention.

For a general understanding of an automatic telephone dialing system wherein the invention has particular utility, reference is made to FIG. 1 wherein various portions of an automatic telephone dial system 9, in accordance with a preferred embodiment of the invention are schematically illustrated. For the sake of clarity, many of the details of the system 9 have been shown in block form or have been omitted, since their operations are well understood to those skilled in the art.

The system 9 in accordance with the invention includes a line selecting apparatus 11 shown within a dotted line box. The line selecting apparatus 11 is adapted to establish connections between originating or calling parties and terminating or called parties as shown generally by telephone subsets (calling parties) 18 and telephone subsets (called parties) 19 respectively. The line selecting apparatus 11 includes a scanner logic 12 and a free running oscillator 10 for providing a stream of pulses to the scanner logic 12 when an originating or calling party subset 18 goes off hook. Normally the free-running oscillator is turned off when a connection is made or terminated between the originating subset 18 and terminating subset 19, viz. idling, as will be described more fully hereinafter. The scanner logic 12 in response to the pulses from the oscillator 10 provides an input to the inverter circuit 14 at 13. The scanner logic 12 as understood in the digital art may include two decade counters and four to sixteen line detectors associated with each counter (not shown) which are disposed such that the output of the scanner logic 12 is actually in the form of a plurality of level dependent signal inputs or functions which correspond to decimal tens and decimal units, for example, 25 may be associated with one of the terminating or called party subsets 19. The inverters 14 may be power amplifiers which provide an isolation function between a line monitoring circuit 16 and the scanner logic 12 and of course invert the incoming signal levels.

There are ten units and fifteen tens lines which are provided as inputs to the plurality line monitoring circuits denoted as a block 16. One of such circuits is shown in detail in FIG. 2 and will be described hereinafter. The other inputs to the line monitoring circuits 16 are provided by the plurality of subsets (the calling party block 18 and called parties block 19) which may in this instance be in the order of, say 200 telephones, and as previously noted are included in the blocks 18 and 19.

When one of the telephone subsets in the block 18 goes off-hook, its line monitoring circuit 16 corresponding to such off-hook subset provides a signal to the oscillator 10 to commence operation. This causes the scanner logic 12 to provide a plurality of pairs of units and tens outputs which can be considered to sequentially stop the line monitoring circuits 16 until the one corresponding to the off-hook subset in block 18 is reached. At this time, the line monitoring circuit 16 sends a second signal to the oscillator 10 causing it to interrupt or stop its operation.

Referring again to FIG. 1, the system 9 includes a matrix array or a matrix switching apparatus 30, for example, a conventional crossbar switching matrix a number of such being manufactured and well known in the art. Such apparatus 30 will be understood to include say, for example, 15 10-by -30 crossbar switches (not shown). Thus, the apparatus 30 has 4,500 crosspoints. Each crossbar switch includes ten hold magnets (not shown) and 12 select magnets (not shown) which may be used to effect selection of 30 different paths. The inverter 14 provides an input (its ten's function) to a group common circuit 40 to effect the actuation of particular ones of the select magnets in the appropriate crossbar switch. As used throughout this disclosure, the term crosspoint refers to a set of ten contacts. Each contact is closed by coordinate operation of select and hold magnets in the apparatus 30. The term hold magnet means the magnetic structure which closes a set of crosspoints in conjunction with the operation of a select magnet. A hold magnet remains operated for the duration of a connection, as compared with the select magnet which releases after the crosspoint is established. In other words, it is necessary to operate the select magnet only while the crosspoint is being established but the hold magnet must be held for the duration of the connection.

Figure 4:
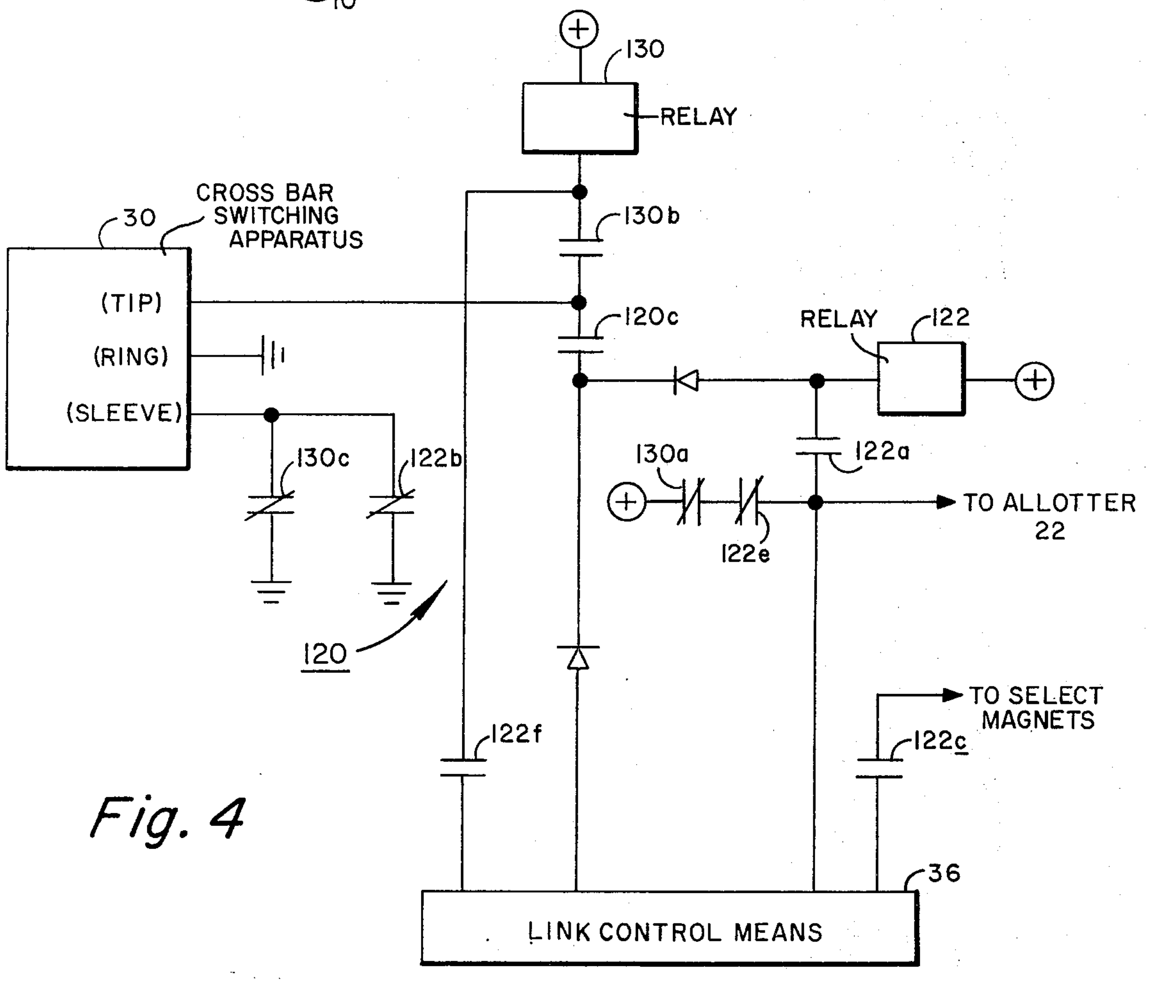
FIG. 4 is a schematic illustration of one of the links included in the block 34 of the system shown in FIG. 1.

In accordance with the invention, there are 23 interconnecting means such as links included within a logic block or link 34 and seven paths are reserved for originating signal responsive means of link control means 36. A single link circuit 120 which is responsive to but a single crossbar appearance is shown in FIG. 4 to include a connecting relay 122 coupled to the tip of one of thirty horizontal appearances such that when a call from the originating or calling party 18 appears on such tip, a connecting relay 122 is energized which closes normally open (N/O) contacts **122*a* and a conventional pulse repeater relay (not shown) which is simultaneously energized in link control means 36. As a result of these relay energizations N/O contacts 122*b* close coupling the sleeve to ground thereby causing the hold magnet 122 to remain energized via the selected crosspoint in the apparatus 30. The contacts 122*a* when closed prevent relay 122 from following the dialed pulses. Contacts 122*c*** are also closed at this time and close a circuit path to the particular select magnets corresponding to a particular link control circuit.

Whenever a circuit path is completed through normally closed contacts **130*a* and 122*e*, the allotter 22 receives a signal indicating that the link is busy and not to be selected by any call. When the called or terminating party answers, the link control means 36 places a ground pulse in the lead carrying N/O contacts 122*f* which are now closed, thereby causing the relay 130 to be energized. Relay opens N/O contacts 130*c*, closes contacts 130*b*. This action causes the aforesaid relay in the control 36 and relay 122 to deenergize. Relay 130 also closes contacts 130*c* to supply ground to the particular sleeve in apparatus 30 preparatory to contacts 122*b* opening. Relay 130 causes the furnishing of transmitter current to both originating and terminating subsets 18 and 19 respectively. Relay 130 remains energized as long as either subset 18, 19** is off-hook.

As will be understood by those skilled in the art, the link control means 36 includes seven identical link control circuits which return dial tone, counts dial pulses, counts digits, requests the common equipment for busy test, rings, and detects the answer. Each link control controls three or four links and is held only long enough to establish the conversation path and then dismissed for use by other links. An allotter 22 shown as a block 22 is effective to distribute the traffic evenly through the system 9. Towards this end, the allotter 22 receives idle path information from the link 34 and the link control 36 and distributes the call requests among the available links shown in the block 34. Those in the telephone art will appreciate that there is a relay in the allotter 22 which is associated with each of the links 34 and the link control 36. The allotter 22 in the particular illustrated embodiment has 23 outputs and provides these as input signals to a diode matrix encoder 42. The allotter is part of the common equipment (certain components of which are not shown). The common equipment as used herein refers to apparatus for controlling the hold and select magnets. The proper sequence is provided for first operating the select magnets followed after a delay by the hold magnet. The output of the diode matrix 42 is in the form of 12 lines, each one of which is associated with a select magnet and is adapted to energize it. As a consequence, the allotter 22 causes the selection of the particular selected magnets to thereby route the next call into a chosen link 34.

After the group common circuitry 40 has been energized and after a predetermined delay, the select magnet, or in certain particular cases select magnets, corresponding to a link is actuated by a sequencer 20. The group common circuit 40 includes circuitry associated with operating the select magnets in each crossbar switch. There is one group common circuit 40 for each crossbar switch. The foregoing arrangement closes crosspoint establishing a connection between the calling telephone subset and the particularly selected link 34. A conventional relay in the selected link is now operated which returns ground on the sleeve in the crossbar switching apparatus 30 to maintain the hold magnet in an energized condition. Each hold magnet has, as those in the telephone art will understand, off-normal contacts. When a hold magnet is energized, its corresponding off-normal contacts disconnect a line monitoring circuit thereby freeing it for service to other calls.

Operation of the previous mentioned relay in one of the links 34 causes a signal to be provided to the allotter 22, notifying it that a link is busy whereupon the allotter 22 internally steps to provide selection of another link. As further will be understood, the same relay in the link connects it to the link control 36 thereby providing a dial tone.

Figure 2:
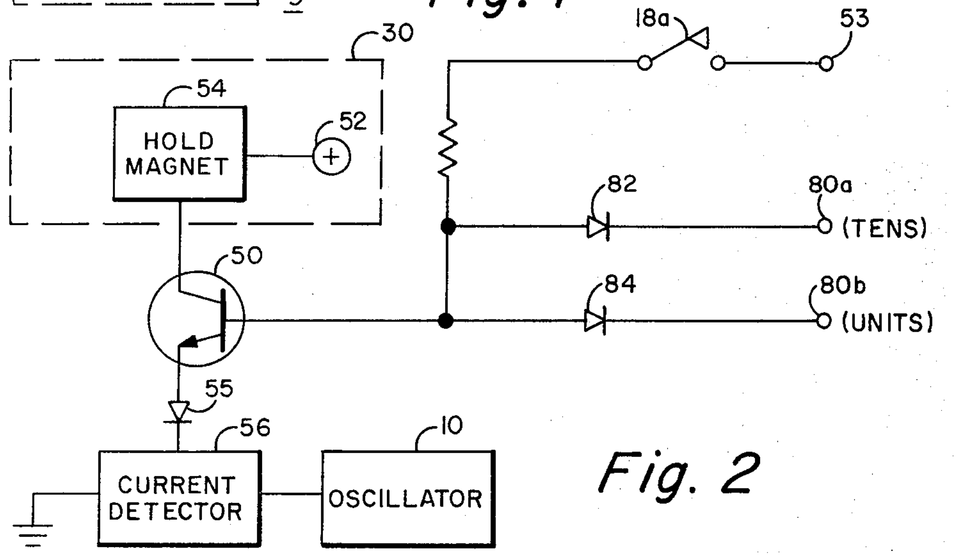
FIG. 2 is a diagrammatic illustration partially in block and partially in schematic form showing one of a plurality of monitoring circuits and a current detecting circuit in accordance with the invention.

Turning now to FIG. 2, there is shown a single line monitoring circuit 16 which includes an NPN transistor 50. In a conductive state the transistor 50 causes current to flow from a positive terminal 52 through a hold magnet 54 (embodied in the apparatus 30), the collector-emitter electrodes of the transistor 50 and a current detector 56 (see FIG. 1) to the ground. The hold magnet 54 then pulls in or is energized and closes the crosspoint and disconnects the circuit 16 from its corresponding line 30. To render the transistor 50 conductive, a switch 18*a* actuated by lifting a particular telephone hand set off-hook and couples a source of positive potential (terminal 53 also shown in FIG. 3) through a resistor 60 to the base electrode of the transistor 50. However, the turn on condition is only satisfied if a positive or high level function signal was applied simultaneously to both the tens and the units terminals 80*a* and 80*b* respectively since otherwise either diodes 82 and/or 84 would be forward biased and provide a conductive path thereby diverting the turn on current.

Figure 3:
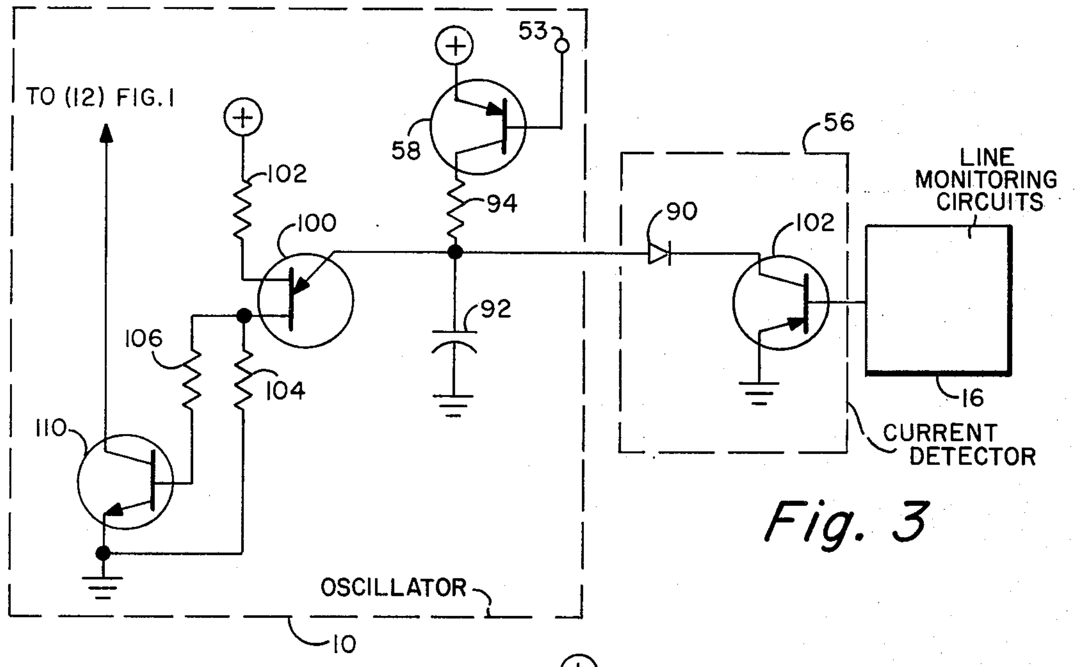
FIG. 3 is a schematic illustration in more detail of the oscillator shown in FIG. 1 and the current detecting circuit shown in FIG. 2.

As previously noted, the oscillator 10 is shown in detail in FIG. 3 as is the current detector block 56. The oscillator 10 is of the relaxation variety and includes a unijunction transistor 100. When the switch 18*a* (see FIG. 2) is closed, current is applied through the terminal 53 to the base electrode of a transistor 58 thereby turning same on and current flows from a source of positive potential through a resistor 94 to a charging capacitor 92. When the capacitor 92 reaches a predetermined charge level, it causes the unijunction transistor 100 to fire and current is thereby conducted from a positive source of potential through a resistor 100, the two base eletrodes of the transistor 100 and a resistor 104 to ground. Also, a positive potential is applied through a resistor 106 to the base electrode of an NPN transistor 110 which turns such transistor on thereby producing an output pulse signal which is applied to the scanner logic 12 (see FIG. 1). Shortly thereafter, the charge level on the capacitor 92 will be depleted to a level which causes the unijunction transistor 100 to turn off. The above operation will then cyclically repeat itself.

When current is applied to the detector 56 which is actually applied to the base electrode of a transistor 102, such transistor is driven into a conductive state and provides a ground connection through the diode 90 thereby preventing the capacitor 92 from acquiring a charge level sufficient to turn the unijunction transistor 100 on. This action effectively shuts off the oscillator 10.

Returning again to FIG. 1, the next step would be to ring the dialed line. Towards this end, in the link control 36 the dial pulses are counted in a counter. The first two digits are transferred in the well known manner to hundreds and tens registers whereas the last digit is held in the pulse counter itself. The link control 36 requests common equipment (portions of which are not shown). If such equipment is busy, it of course waits. A lockout circuit (not shown) prevents more than one link control from providing input signals to the inverter 14. The inverter 14 thereby applies particular function signals to the group common circuitry 40. The group common 40 of course selects the particular switch magnet(s) and the link control choses the select magnets. The system now operates in a similar manner to that when it was in a line finding mode except that the select magnets are no longer controlled by the allotter 22 but this time are controlled by the link control circuitry 36. After the predetermined time interval (as previously described) the hold magnet is pulled effecting the connection between link control and the dialed line via the crossbar switching apparatus 30 thereafter linking of the line takes place and the called or dialed party is ringed.

If the dialed party lifts his handset which in telephone parlance is called tripping the ringing, common equipment is again requested. The dialed line operates via the link circuitry 34 appropriate select magnets for such link and re-energizes the hold magnet of the dialed line thereby establishing a connection between the link to which the calling party is already connected and dialed line. Now conversation between the two parties may proceed. At this point, the link control 36 is dismissed so that it may serve other associated links if they are idle. After the conversation is completed and both parties hang up, the relay in the link 34 is de-energized and the crosspoints in the crossbar switching apparatus 30 are opened.

The invention has been described in detail with particular reference to a preferred embodiment thereof, but is will be understood that variations and modifications can be effected within the spirit and scope of the invention.

What is claimed is:

1. In a telephone system a telephone line selecting apparatus for use in connecting one of a plurality of lines corresponding to a particular one of a plurality of subsets to one of a plurality of interconnecting means via a matrix switching apparatus comprising:

a. oscillator circuit means effective when running to provide a stream of pulses;

b. scanner means responsive to said pulses to provide a plurality of level dependent function signals, particular ones of which correspond to decimal units and other ones which correspond to decimal tens with particular units and tens functions signals corresponding to particular lines respectively;

c. a plurality of line monitoring circuit means coupled to said scanner means, each of said line monitoring circuit means being associated with a particular line and having a units input terminal and a tens input terminal and effective when each of its units and tens terminals simultaneously receives a function signal from said scanner means to effect the actuation of said matrix switching apparatus; and d. a single current detector circuit means coupled to said plurality of line monitoring circuit means and effective for stopping said oscillator circuit means when at least one of said plurality of monitoring circuit means is operative.

2. The invention as set forth in claim 1 wherein each of said plurality of line monitoring circuit means includes a first transistor effective when turned on to actuate a particular matrix coordinate means for defining the units and tens terminals and effective only when the corresponding subset is engaged and the units and tens terminals receive function level signals to turn on said first transistor.

3. The invention as set forth in claim 2 wherein said oscillator circuit means includes a unijunction transistor and a charging capacitor effective to cause said unijunction transistor to fire when a predetermined charge is stored on said capacitor.

4. The invention as set forth in claim 3 wherein said current detector circuit means is coupled to said capacitor and operative to prevent said charging capacitor from reaching said predetermined charge.

5. The invention as set forth in claim 4 including buffer means coupling said scanner means to said plurality of line monitoring circuit means.

6. The invention as set forth in claim 5 wherein said telephone system includes originating signal responsive means coupled to the matrix switching apparatus.

* * * * *